(12) United States Patent
Clee et al.

(10) Patent No.: US 8,966,449 B2
(45) Date of Patent: *Feb. 24, 2015

(54) TEST CASE PATTERN MATCHING

(75) Inventors: Scott J. Clee, Winchester (GB);
Jonathan S. Tilt, Romsey (GB); Daniel E. Would, Eastleigh (GB); Shanna Xu, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/434,495

(22) Filed: Mar. 29, 2012

(65) Prior Publication Data

US 2012/0192156 A1  Jul. 26, 2012

Related U.S. Application Data

(63) Continuation of application No. 12/643,893, filed on Dec. 21, 2009, now Pat. No. 8,627,290.

(30) Foreign Application Priority Data

Feb. 3, 2009 (EP) .................................. 09151985

(51) Int. Cl.
*G06F 9/44* (2006.01)
*G06F 11/36* (2006.01)
(52) U.S. Cl.
CPC .. *G06F 8/70* (2013.01); *G06F 8/71* (2013.01); *G06F 8/75* (2013.01); *G06F 11/3604* (2013.01); *G06F 11/3676* (2013.01)
USPC ....................................................... 717/125
(58) Field of Classification Search
None
See application file for complete search history.

(56) References Cited

U.S. PATENT DOCUMENTS

| | | | |
|---|---|---|---|
| 6,473,794 B1 | 10/2002 | Guheen et al. | |
| 2004/0172598 A1 | 9/2004 | Hammerich et al. | |
| 2007/0061294 A1 | 3/2007 | Parnell et al. | |
| 2007/0299825 A1 * | 12/2007 | Rush et al. ......................... | 707/3 |

OTHER PUBLICATIONS

United States Patent and Trademark Office, Office Action for U.S. Appl. No. 12/643,893, Feb. 14, 2013, pp. 1-7, Alexandria, VA, USA.
United States Patent and Trademark Office, Notice of Allowance for U.S. Appl. No. 12/643,893, Aug. 28, 2013, pp. 1-13, Alexandria, VA, USA.
United States Patent and Trademark Office, Office Action for U.S. Appl. No. 12/643,893, Jun. 7, 2013, pp. 1-9, Alexandria, VA, USA.

* cited by examiner

*Primary Examiner* — Henry Tsai
*Assistant Examiner* — Juanito Borromeo
(74) *Attorney, Agent, or Firm* — Lee Law, PLLC; Christopher B. Lee

(57) ABSTRACT

A method of providing feedback on source code being created includes receiving source code and processing the received source code according to a predefined rule set to create a representation of the received source code. A source code repository is accessed that includes source code fragments. Each source code fragment in the repository has been processed according to the predefined rule set to create representations of the respective source code fragments. The representation of the received source code is compared to each representation of the source code fragments. A matching score is calculated for the representation of the received source code with respect to each representation of the source code fragments based upon an output of the comparison step. An output derived from the calculated matching scores is presented.

5 Claims, 8 Drawing Sheets

TEST CASE PATTERN MATCHING

RELATED APPLICATIONS

This application is a continuation of and claims priority to and claims the benefit of U.S. patent application Ser. No. 12/643,893 titled "TEST CASE PATTERN MATCHING," which was filed in the United States Patent and Trademark Office on Dec. 21, 2009, and which is incorporated herein by reference in its entirety; and this application also claims priority to and claims the benefit of European Patent Application Serial No. EP09151985.0 titled "TEST CASE PATTERN MATCHING," which was filed in the European Patent Office on Feb. 3, 2009, and which is also incorporated herein by reference in its entirety.

BACKGROUND

The present subject matter relates to a method of, and system for, providing feedback on source code being created. In one embodiment, the invention may be used for real-time test case pattern matching.

Software testing is an investigation carried out to provide information about the quality of the software product under test, in relation to the environment in which it is intended to operate. This includes, for example, the execution of a program with the intent of finding errors. The primary purpose of such software testing is to discover failures so that the detected errors may be corrected. The scope of software testing often includes the execution of the code in various environments and under different conditions. In the current culture of software development, a testing organization may be separate from the development team. Information derived from the software testing may be used to correct the original process by which the software is developed.

With the increasing time and resource pressures on test organizations it is vitally important that every new test case that is written is as effective as possible. Test effectiveness, in this context, means that a new test case would exercise the maximum amount of the system under test's (SUT) untested code with the minimum amount of overlap and duplication of existing test cases. The ideal situation in relation to testing using a test suite would be to have test cases that all exercise different areas of the software code. The main benefit being that there is no duplication of test code or effort. However, there is an added benefit in that it becomes easier to isolate bugs.

In the case where each test is testing a different part of the code it is likely that one bug in the SUT may only cause one test case to fail. In reality, the coverage provided by the tests tends to be creation tests that are overlapping, in relation to the code that comprises the SUT. This results in large amounts of duplication and overlap and consequently, large amounts of wasted effort. It also means that a single bug may be likely to cause the failure of multiple test cases, thus making debugging more complex. The problem is that the test case programmer receives little help in determining the effectiveness of their test until it is too late to do anything about it.

The current solution to this problem is to use code coverage instrumentation, for example, tools such as EMMA (emma.sourceforge.net) during the test execution phase, and then carry out a complex analysis of the output to determine which SUT code is covered by each test case. At this point, overlaps and duplication may be identified so that a more modular test suite may be produced on the second pass. However, the main drawback to this solution is that it is necessary to write all the test code, set up the SUT, instrument the SUT, execute the test cases, analyse the code coverage output, and finally make the assessment on each test's effectiveness before the test programmer may take any action. This is a very time consuming and costly exercise to do properly. In addition, the test code programmers are very reluctant to change what is probably already a valid test case just to remove the duplication. So, valuable time and resources may be wasted.

BRIEF SUMMARY

According to a first aspect of the present invention, there is provided a method of providing feedback on source code being created comprising: receiving source code; processing the received source code according to a predefined rule set to create a representation of the received source code; accessing a source code repository comprising source code fragments, each source code fragment in the repository processed according to the predefined rule set to create a representation of the respective source code fragments; comparing the representation of the received source code to each representation of the source code fragments; calculating a matching score for the representation of the received source code with respect to each representation of the source code fragments based upon an output of the comparison step; and presenting an output derived from the calculated matching scores.

According to a second aspect of the present invention, there is provided a system of providing feedback on source code being created comprising a display device; a user interface arranged to receive source code; and a processor programmed to: process the received source code according to a predefined rule set to create a representation of the received source code; access a source code repository comprising source code fragments, each source code fragment in the repository processed according to the predefined rule set to create a representation of the respective source code fragments; compare the representation of the received source code to each representation of the source code fragments; calculate a matching score for the representation of the received source code with respect to each representation of the source code fragments based upon an output of the comparison step; and present an output derived from the calculated matching scores via the display device.

According to a third aspect of the present invention, there is provided a computer program product on a computer readable storage medium including computer readable program code for providing feedback on source code being created, wherein the computer readable program code when executed on a computer causes the computer to: receive source code; process the received source code according to a predefined rule set to create a representation of the received source code; access a source code repository comprising source code fragments, each source code fragment in the repository processed according to the predefined rule set to create a representation of the respective source code fragments; compare the representation of the received source code to each representation of the source code fragments; calculate a matching score for the representation of the received source code with respect to each representation of the source code fragments based upon an output of the comparison step; and present an output derived from the calculated matching scores.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
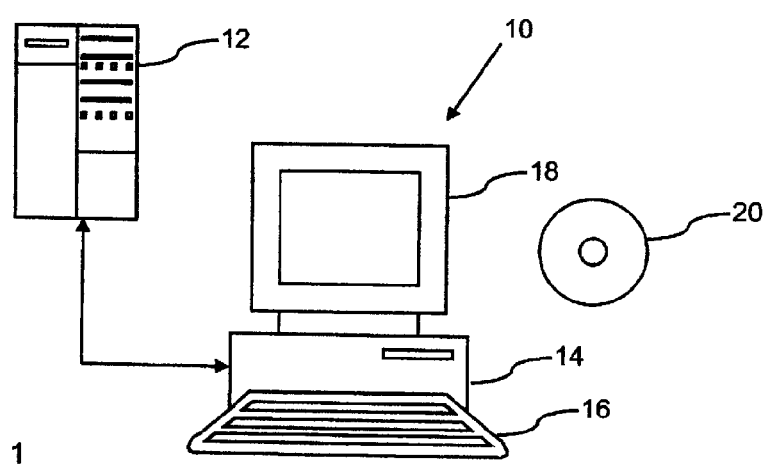
FIG. 1 is a schematic diagram of a client device connected to a server according to an aspect of the present subject matter.

Owing to the present subject matter, a method is provided that is capable of letting the test programmer know in real time (i.e. at the point that they are actually writing the code) whether an area of code they are attempting to test has already been exercised. In addition to letting the programmer know about existing test cases, the method may also identify areas of testing that may be rationalized or reused across a test suite to enhance maintainability. The method may recognize patterns in the test code and match them with existing patterns in the source code, to highlight potential duplication. The assumption being that similar patterns of test code will drive similar code coverage patterns in the SUT. By moving the verification as early in the process as possible, test organizations may realize large savings in time and resources by developing more effective test cases.

The method and system may be used to provide a user interface allowing code development with continuous reference to a code repository, and visual feedback on the uniqueness of the code being written. This allows a developer to instantly have reference to potential areas of re-use, as well as a clear indication of when a test is treading new ground. So that code in an editor will have visual cues, color may be used to identify code that exists in full or in part within existing files in the code repository. By showing common routines and providing links to other examples, a developer may quickly have reference to code that is intended to be similar, as well as quickly show that new code is indeed testing sequences that are not already covered by existing tests.

Furthermore, the immediate feedback on where sequences of calls exist already in the code base may lead to identification of functions currently implemented in a single test case that may be generic helper functions (since they are about to be needed by the new code). The editor may provide the ability to re-factor a function from its point in the code repository to be added to a helper function that may then be called by the existing test, and this new test. This step may require re-factoring of the original test case, and the function itself, if the function was not originally written to be modular. However any variable references that relied on global scope may be fixed by making them function inputs.

The resulting interface may yield significant productivity gains, allowing testers to stick to standard style where they expect code to be similar, and quickly identify any existing similar test code. The method allows the minimizing of the time that is spent re-writing code that already exists, and maximizing confidence that new code is indeed testing new things within the SUT.

Advantageously, the step of comparing the representation of the received source code to a representation of a source code fragment comprises comparing one or more lines of the representation of the received source code to one or more lines of the representation of the source code fragment. A line by line comparison may be used to compare the source code being entered to the source code stored in the repository. This provides a simple and efficient method of determining the extent of the similarity between the two components.

In one embodiment, the step of calculating a matching score for the representation of the received source code with respect to a representation of a source code fragment comprises calculating a binary score indicating whether there is a match. The method may be used to identify only those components within the stored source code of the repository that are identical to the new source code being created.

In a further embodiment, the step of calculating a matching score for the representation of the received source code with respect to a representation of a source code fragment comprises calculating a score based upon the number of matching lines between the representation of the received source code and the representation of the source code fragment. An improved feedback result may be achieved by deriving a matching score from the extent of the match between the new source code and the existing source code. This may be a percentage of lines that match between the two components, or may be a number representing the number of patterns within the new source code that match with the existing source code. This may be used to provide an output to the user that may support a more intelligent review of those parts of the existing source code that are relevant to the new source code being created.

The step of presenting an output derived from the calculated matching scores comprises displaying a representation of the source code repository indicating the matching of the representation of the received source code with respect to the representations of the source code fragment, the representation indicating the level of matching within portions of the source code repository. The user may be provided with a visualization of the stored source code that indicates where there is matching to the current source code being created, and also the user may receive an indication of the extent of that matching. An alternative visual representation may be that the source code that the user is creating is highlighted in some way to indicate those portions that match existing source code. For example, the user may enter ten lines of source code, and those lines that are detected as existing already may be highlighted to the user.

A client device 10, such as a standard desktop computer 10, is shown in FIG. 1. The client device 10 is connected to a remote server 12, which functions as a source code repository 12. The client device 10 comprises a processor 14, a user interface 16 and a display device 18. Further components of the client device 10 are also present, but not shown, such as storage components and network connections and so on. The client device 10 serves the function of allowing a software developer or software tester to create source code, either for the purpose of adding to or amending the source code already present on the source code repository 12, or for the purpose of creating one or more tests for use in a testing of source code on the source code repository 12. A computer readable medium 20 is provided, such as a CD-ROM, which stores a suitable software developer kit (SDK) for creating the source code, when that SDK is run by the client device 10.

Figures 2A, 2B:
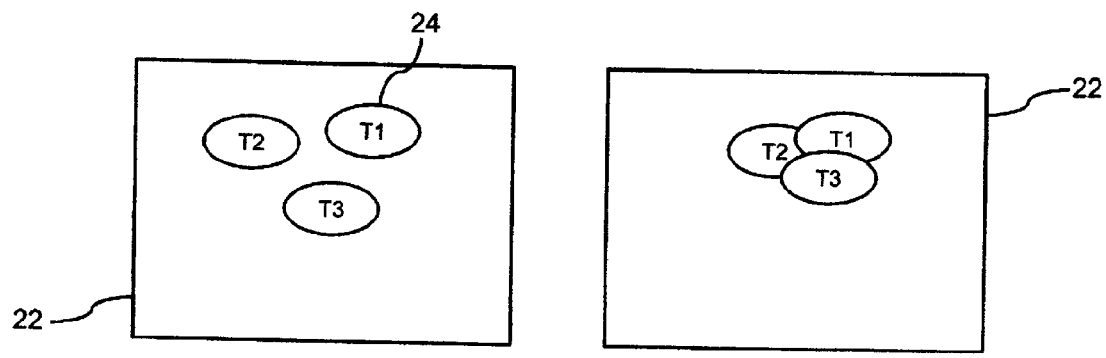
FIG. 2a is a first portion of a schematic diagram of a system under test according to an aspect of the present subject matter.
FIG. 2b is a second portion of a schematic diagram of a system under test according to an aspect of the present subject matter.

FIGS. 2a and 2b illustrate the concept of software testing, in relation to source code 22, which is stored by the source code repository 12. A software tester, or software testing team, may write source code for testing programs 24. The ideal situation is illustrated in FIG. 2a, in which three testing programs 24 have been written that each test different parts of the source code 22. However, in reality the test coverage tends to be closer to the arrangement shown in FIG. 2b. In this FIG. 2b, the test programs 24 overlap, in relation to the source code 22 that is actually being tested. This has various inefficiencies, as discussed above. For example, overlapping test programs 24 makes it harder to test the entire source code 22, and may also return multiple errors that actually relate to the same bug in the source code. This latter problem leads to duplication in relation to the debugging of the source code 22 of the system under test.

The solution to the problems such as those described above is a system in three principal parts. First, there is provided a method and system for indexing the repository 12 of source code 22, based on a canonical form template to be appropriate to the language/context of the source code 22. For example, a typical language canonical form may ignore all comments within the source code 22, and refer to all variables based on their type, and constant value (where applicable). The indexing may also provide a means of representing tests as sequences of function calls, grouped in accordance with a template to represent calls which equate to product API/test infrastructure calls/base function library calls.

Figure 3:
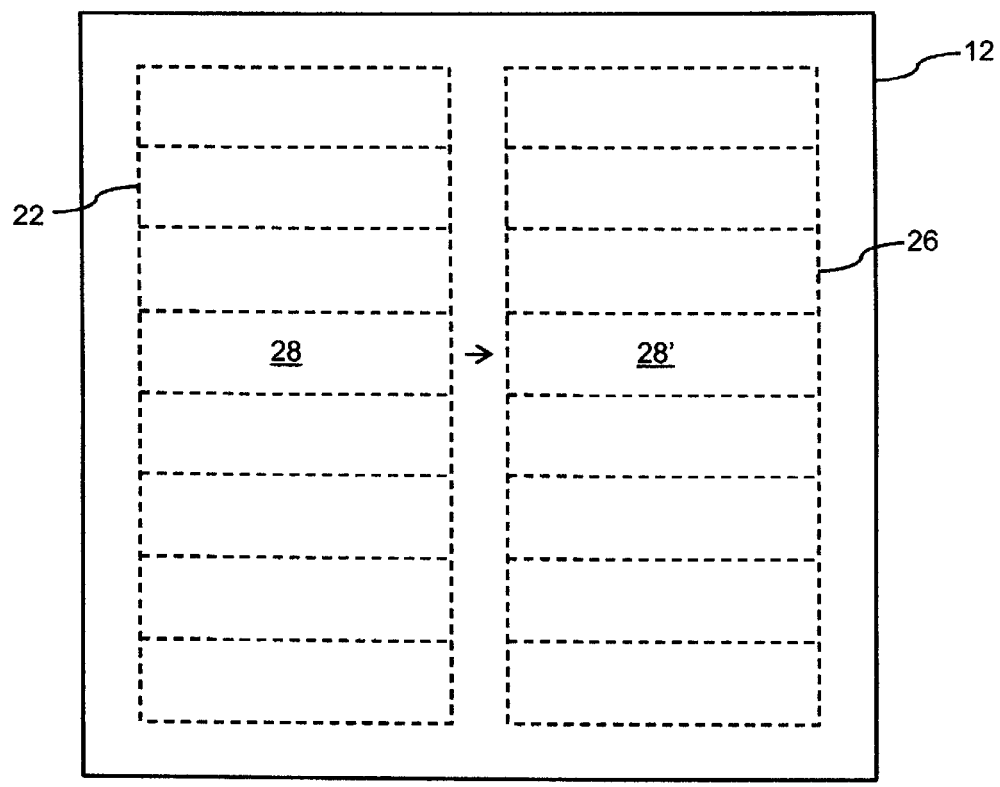
FIG. 3 is a schematic diagram of a source code repository according to an aspect of the present subject matter.

FIG. 3 illustrates the principle of an indexed source code repository 12. The source code 22 stored in the repository 12 is processed in such a way as to be converted to a representation 26. Individual fragments 28 of the source code 22 are converted to respective representations 28' of the fragments 28. The fragments 28 may be individual routines within the source code 22 or may just be one or more lines of source code, without necessarily any logical break between individual fragments 28. The processing is carried out according to a rule set, which comprises one or more rules. The rule set may be specific to the language used in the source code 22.

Each fragment 28 of the original source code 22 may be processed, using the predefined rule set, to produce a respective representation 28' of the original fragment, within the overall representation 26. The purpose of the conversion of the original source code 22 is to remove and/or change aspects of the source code 22 that would make later searching difficult. For example, comments inserted by developers have no programming purpose other than to inform later readers of the source code 22 about the function of particular routines, and may be removed in the translation from the original source code 22 to the representation 26. Similarly, certain types of routines and functions embodied by the fragments 28 of the source code 22 may be converted into a predefined format using a template specified in the rule set.

Second, an editor, or plug-in for the SDK, is provided, which will dynamically hold a canonical representation of an active code fragment using the same rules as are currently active for the code repository 12. Additionally, the editor may provide visual feedback colored to indicate duplicated code areas and uniqueness.

Figure 4:
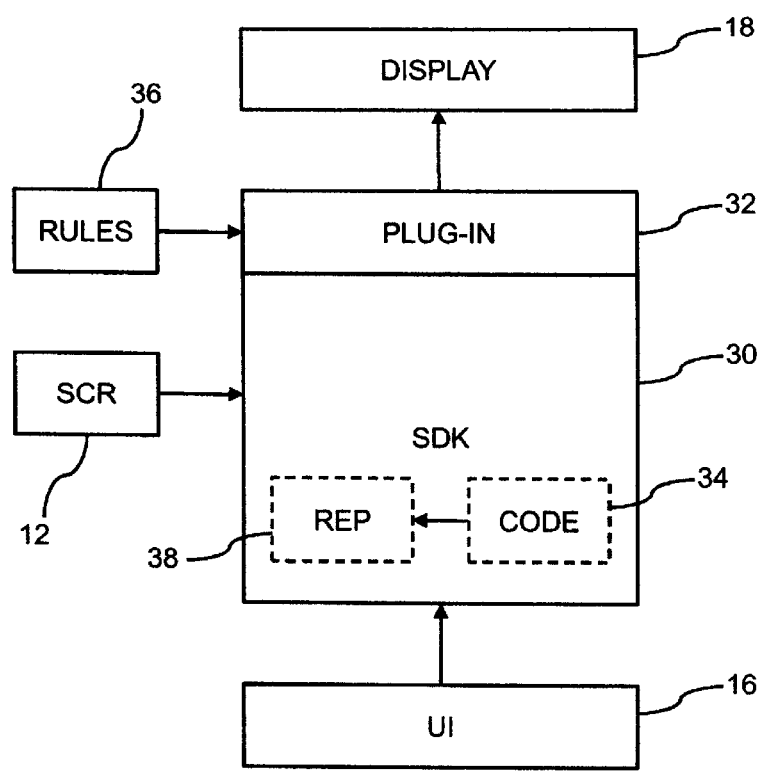
FIG. 4 is a schematic diagram of a software development kit and further processing components according to an aspect of the present subject matter.

FIG. 4 shows the SDK 30 and a plug-in 32, which are receiving source code 34 from the user interface 16, as it is created by a software tester for example. The plug-in 32 provides access to the rule set 36, which supports the transformation of the received source code 34 into a representation 38. As in the processing of the existing source code 22 in the repository 12, the rule set 36 will remove and amend the received source code 34 to create a new representation 38 of the source code 34.

Finally, a search engine is used, which may form part of the SDK 30, the plug-in 32, or may be a completely separate unit. The search engine takes in the canonical code fragments 38, and separates them into API sequences, to perform independent searches against the source code 22 of the indexed code repository 12. Each sequence is searched as a multiple set. First a search for just the first line gives a hit count for its occurrences, then a search for the first and second in a sequence gives a count for the occurrences of both lines in that order. The sequence is continued until there are 0 counts for the set in a row. This forms a break point and a new search is performed for only the last line and its count is also determined, forming the start of potentially a new group of calls in a sequence. Once completed the search results yield scores for each sequence of calls in terms of the hit count on the existing code base. By separating the sequences as they apply to separate APIs it is possible to ignore irrelevant differences, such as the order of unrelated calls. The values are fed to the editor visualization, which is displayed on the external display 18, which codes each entry in the code fragment with its own uniqueness, and a second value for the group (if any) that it is within.

Figure 5:
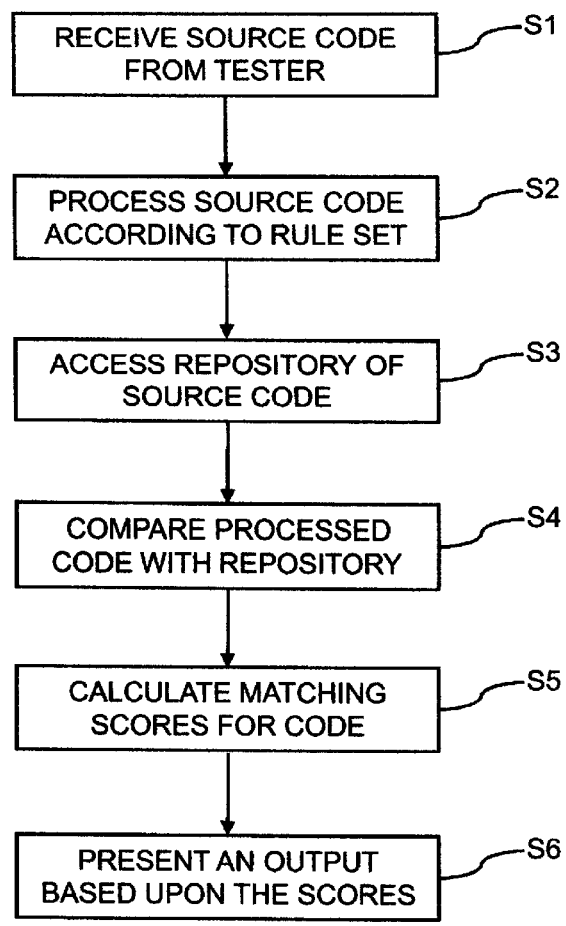
FIG. 5 is a flow chart of a method of providing feedback on source code being created according to an aspect of the present subject matter.

FIG. 5 shows a flowchart of an embodiment of an implementation of the methodology described above. The method of providing the feedback on the source code 34 being created comprises first, at step S1, receiving the source code 34 and second, at step S2, processing the received source code 34 according to the predefined rule set 36 to create the representation 38 of the received source code 34. As discussed above, the received code 34 is converted to a format that enables comparison with the stored source code 22 of the repository 12.

The next step is the step S3 of accessing the source code repository 12, where each source code fragment 28 in the repository 12 has already been processed according to the same predefined rule set 36 to create a representation 28' of the respective source code fragments 28. At step S4, there is then carried out the step of comparing the representation 38 of the received source code 34 to each representation 28' of the source code fragments 28. In one embodiment, the step S4 comprises comparing one or more lines of the representation 38 of the received source code 34 to one or more lines of the representation 28' of a source code fragment 28 stored in the repository 12.

The next step S5 comprises calculating a matching score for the representation 38 of the received source code 34 with respect to each representation 28' of the source code fragments 28 based upon the output of the comparison step S4. In one form, the step of calculating a matching score comprises calculating a binary score (1 or 0) indicating whether there is a match or not. In another arrangement, the step of calculating a matching score comprises calculating a score based upon the number of matching lines between the representation 38 of the received source code 34 and the representation 28' of the source code fragment 28. In this latter case, the match may be represented as a percentage, for example, giving a range of 0% (no match at all) to 100% (the two representations being identical).

The final step in the method is step S6, which comprises presenting an output derived from the calculated matching scores. Preferably, this step comprises displaying a representation of the source code repository 12 indicating the matching of the representation 38 of the received source code 34 with respect to the representations 28' of the source code fragment 28, the representation indicating the level of matching within portions of the source code repository 12.

Figure 6:
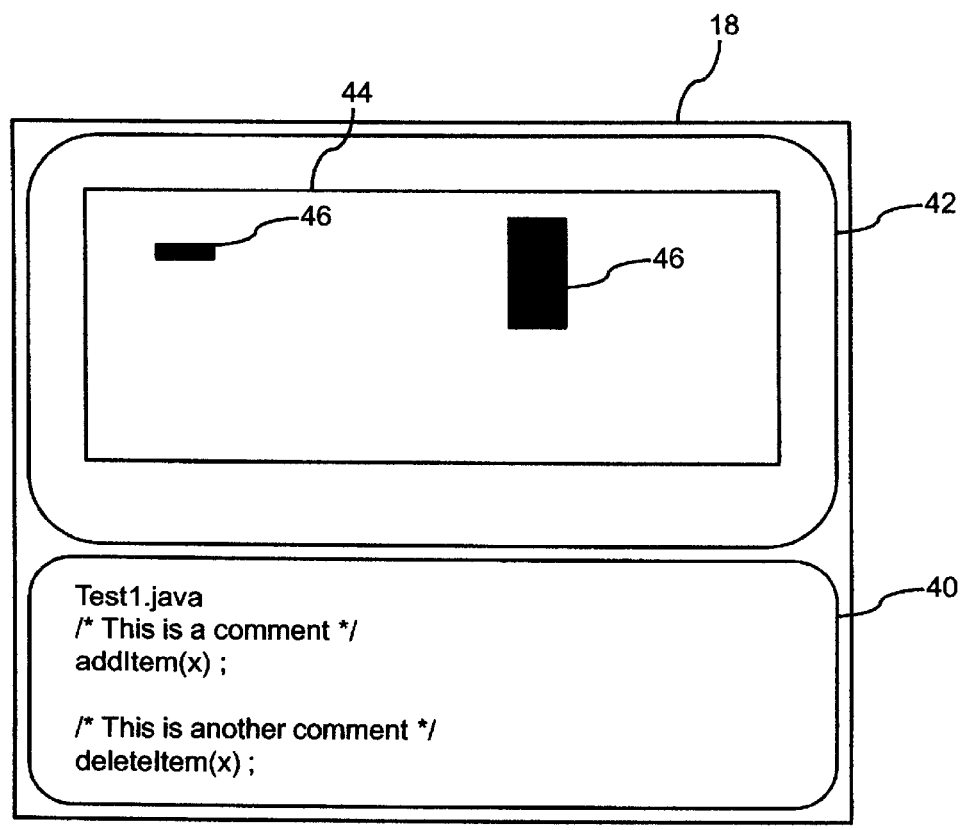
FIG. 6 is a schematic diagram of a display device showing a software developer kit according to an aspect of the present subject matter.

FIG. 6 shows one example of how a presentation to the user may look, in relation to providing the feedback to the user about the current source code being created. The processor 14 is running a software developer kit 30 with a plug-in 32, as described above, with reference to FIG. 4. The display device 18 shows a graphical user interface to the SDK 30 which comprises two windows 40 and 42. The window 40 shows the text editor, where the source code 34 entered by the test programmer is shown, and the window 42 shows the display of the representation 44 of the source code 22 in the source code repository 12.

The matching process has identified two parts 46 of the source code 22, in the repository 12, as matching the current source code 34 entered by the user. The icons 46 indicating the match may be color coded to represent the extent of the match, if a percentage system is being used, for example. Alternatively, if a binary system of matching is being used, then the parts of the source code 22 that are identical to the entered source code 34 may be indicated. It should be understood that the matching is between the representations of the two source codes, i.e. after they have been processed with the rule set 36 to convert them to the template form of the source code.

The user interface may provide various features that the user may access to improve the functionality of the matching and display process. For example, the SDK may be arranged so that the user may switch between the binary and graded systems of matching, and indeed set the level of the grading. For example, if a percentage system is being used, then the user may set a level such as 90%, and only those portions of the source code 22 that have a 90% or greater similarity with the source code 34 being entered may be displayed to the user. The user may also drill down into the code as displayed in the window 42, with a zoom like function. This may be used to find out more detail about the matching code indicated by the icons 46.

To aid understanding, the following steps provide a practical example of how the method may be implemented for the specific piece of source code shown in FIG. 6. These steps are to be done in real-time as the user is typing code into the editor.

Step 1: Code is written in an editor such as Eclipse

```
Test1.java
/* This is a comment */
addItem(x);
/* This is another comment */
deleteItem(x);
```

Step 2: A canonicalized version of the code is held internally, in which all comments, white space and formatting is removed. This enables code to be compared from people with different coding styles.

```
Test1.java canonicalized code
addItem(x);
deleteItem(x);
```

Step 3: Encode function calls to differentiate overloaded parameters. A sample encoding mechanism to differentiate overloaded functions may be addItem(String)->addItem_String and addItem(int)->addItem_Int. Applying this to Test1.java we get:

```
Test1.java encoded calls
addItem_String
deleteItem_String
```

Step 4: Generate patterns down to maximum depth

From the above code it is possible to get three unique patterns. As the number of lines increases so does the number of patterns, at an exponential rate. A maximum depth value may be used to limit the number lines that are used to generated patterns in a section of code.

```
Test1.java patterns
1.  addItem_String
2.  deleteItem_String
3.  addItem_String
      deleteItem_String
```

Step 5: Compare generated patterns against stored patterns and flag existence switch on existing patterns. When code is integrated into a code repository its code patterns are generated and stored in a database (such as DB2) for real-time pattern matching. It is this database that the above patterns are compared against.

Below are some scenarios that show the effectiveness of pattern matching against test cases. It is assumed that Test1.java from Step 1 has already been integrated into the code repository and therefore its patterns exist in the database.

Scenario 1: Test2a.java contains exactly the same code as Test1.java

```
Test2a.java (canonicalized & encoded)
addItem_String
deleteItem_String
Test2a.java patterns
1.  addItem_String [EXISTS]
2.  deleteItem_String [EXISTS]
3.  addItem_String
      deleteItem_String [EXISTS]
```

Looking at the patterns it may be seen that they already exist. Therefore Test2b.java is giving no additional value on top of what is already present.

Scenario 2: Test2b.java contains same code as Test1.java, but the other way around

```
Test2b.java (canonicalized & encoded)
deleteItem_String
addItem_String
Test2b.java patterns
1.  addItem_String [EXISTS]
2.  deleteItem_String [EXISTS]
3.  deleteItem_String
      addItem_String [NEW]
```

By switching the deleteItem_String and addItem_String calls around there has now been generated a new test case, as shown in pattern 3.

Scenario 3: Test3.java add a new function call

```
Test3.java (canonicalized & encoded)
addItem_String
changeItem_String
deleteItem_String
Test3.java patterns
1.  addItem_String [EXISTS]
2.  changeItem_String [NEW]
3.  deleteItem_String [EXISTS]
4.  addItem_String
    changeItem_String [NEW]
5.  changeItem_String
    deleteItem_String [NEW]
6.  addItem_String
    changeItem_String
    deleteItem_String [NEW]
```

By adding another function call (changeItem_String) the coverage of the test has changed since there are four new patterns being tested. Therefore Test3.java provides considerable value on top of the tests already in the code repository.

Step 6: Visually represent findings in real-time. Even a simple count of existence flags gives a value of four. Having understood which code patterns are new and which ones already exist, this data may be visually presented to the user. A simple mechanism for this would be to count the [NEW] flags for a block of code and show the value. In this case, Test2a.java would have a value of "0" to signify it has little value. Test2b.java has a value of "1" and Test3.java has a value of "4".

Figure 7:
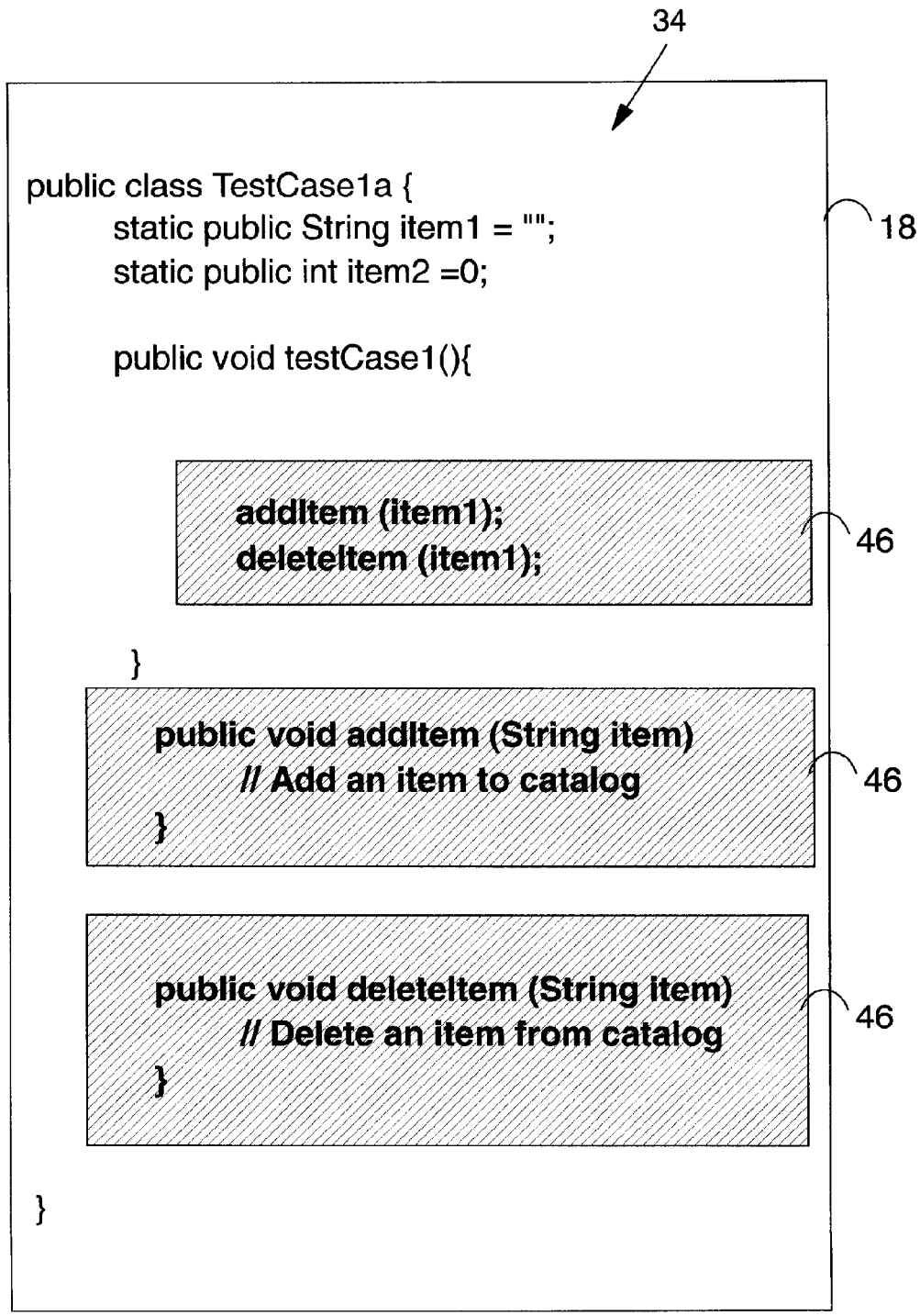
FIG. 7 is a schematic diagram of a display device showing a software developer kit according to an aspect of the present subject matter.
Figure 8:
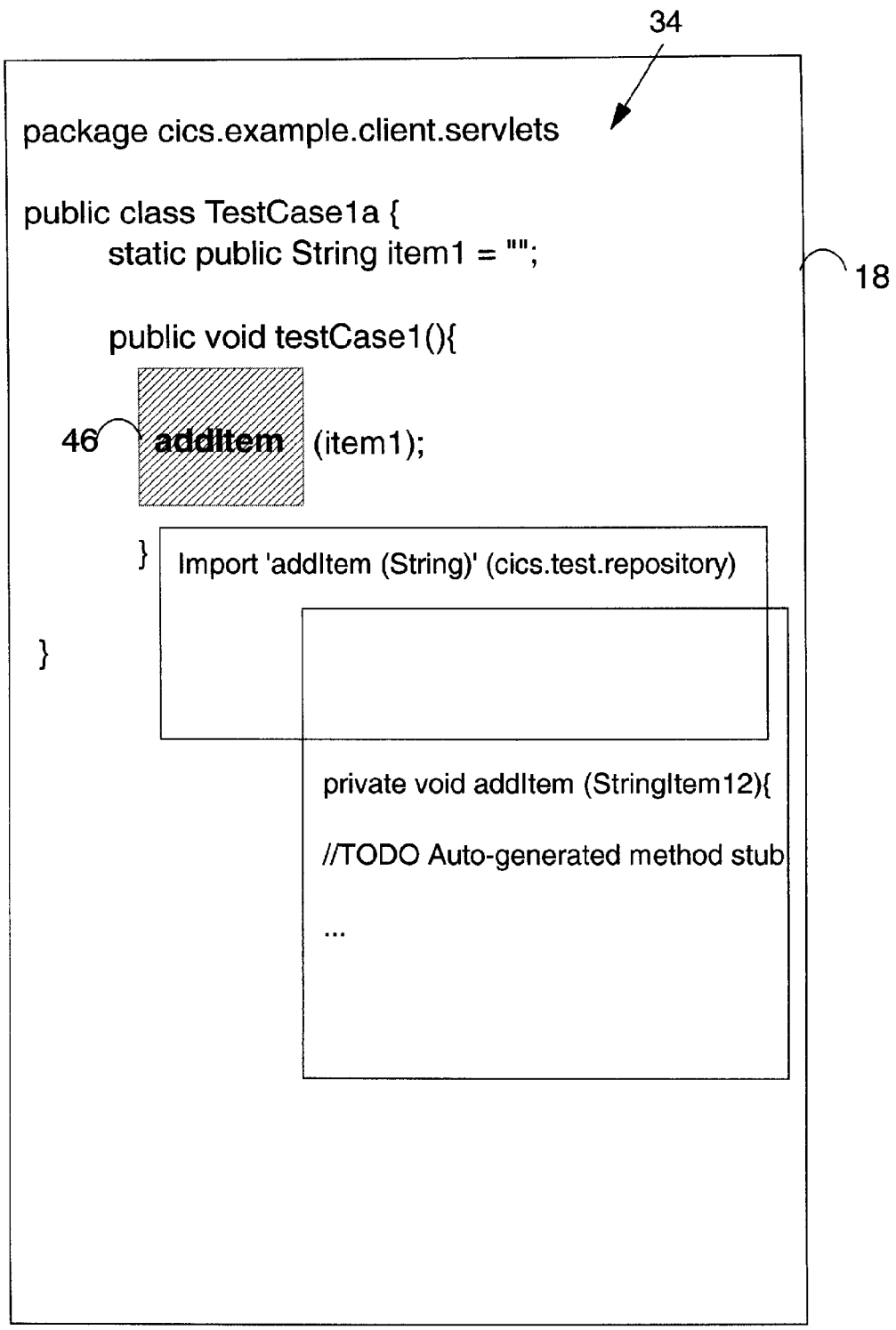
FIG. 8 is a schematic diagram of a display device showing a software developer kit according to an aspect of the present subject matter.
Figure 9:
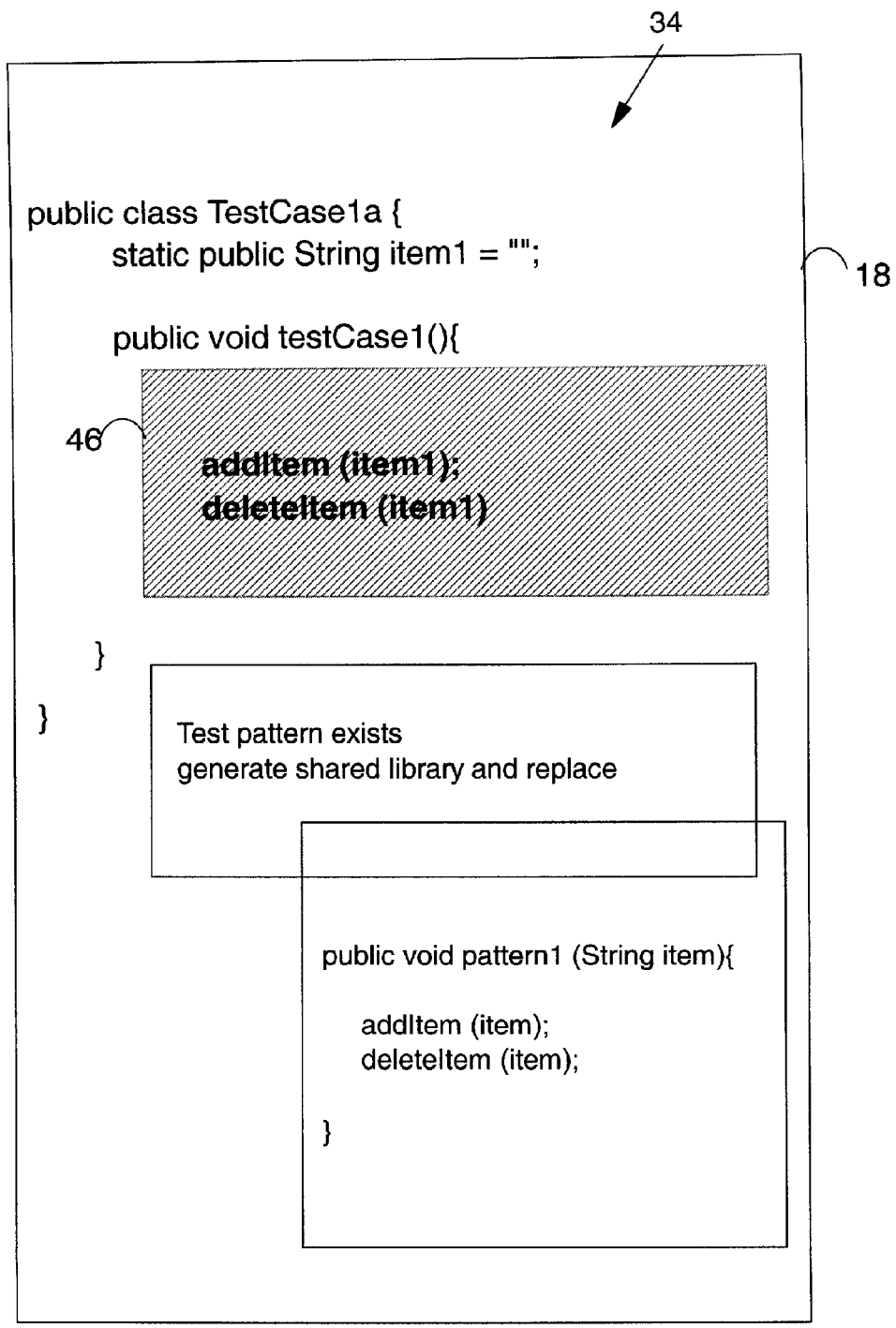
FIG. 9 is a schematic diagram of a display device showing a software developer kit according to an aspect of the present subject matter.

Other mechanisms may be to change the background color of the lines of code to signify their value. In this case, blocks of code may be shown to have a background color or shading if they provide no additional value, and potentially a different color or shading to show unique patterns. Additionally grades of color may be chosen to indicate larger stretches of repeated code, such that the more lines in a row that are found elsewhere in the repository the darker the color. FIG. 7 shows an alternative view of the visualisation of the matching process, in which the display device 18 shows the entered source code 34 with existing code 46 highlighted by shading. Warnings may be provided on the left hand side bar (not shown) providing access to quick help features to provide options such as importing existing functions or refactoring to new shared features. FIG. 8 shows the prompt to import existing functions from the code repository to create a new test pattern, and FIG. 9 shows a tool used to detect an existing pattern and to prompt a user to generate a shared library. These example mechanisms may give the developer real-time feedback at the point of writing code to steer them to writing the most effective code based on the existing information within the code repository.

The system described above also has the additional benefit of highlighting potential code re-use. For example, when new code is written, where areas of it are shown to already exist in the code repository this highlights potential areas of code re-use. This common pattern code may be put into a library function and called from the many areas where it is shown to exist.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of providing feedback on source code being created comprising:

receiving source code;

processing the received source code according to a predefined rule set to create an encoded text string representation of each function of the received source code, where each encoded text string representation comprises a text string that identifies each parameter type of the respective function of the received source code, and where the encoded text string representation of each function of the received source code is usable to identify existing source code similar to the received source code;

accessing a source code repository comprising source code fragments and an encoded text string representation of each source code fragment, each source code fragment in the repository processed according to the predefined rule set to create the encoded text string representation of the respective source code fragment to comprise, for each function of the source code fragment, a text string that identifies each parameter type of the respective function of the source code fragment;

comparing, in real time, the encoded text string representation of each function of the received source code to each encoded text string representation of the source code fragments;

calculating a matching score for the encoded text string representation of each function of the received source code with respect to each encoded text string representation of the source code fragments based upon an output of the comparison step; and presenting an output derived from the calculated matching scores.

2. A method according to claim 1, where comparing, in real time, the encoded text string representation of each function of the received source code to each encoded text string representation of the source code fragments comprises comparing one or more lines of the encoded text string representation of the received source code to one or more lines of the encoded text string representation of the source code fragments.

3. A method according to claim 2, where the step of calculating the matching score for the encoded text string representation of each function of the received source code with respect to each encoded text string representation of the source code fragments comprises calculating a score based upon a number of matching lines between across all of the encoded text string representations of the received source code and the encoded text string representations of the source code fragments.

4. A method according to claim 1, where the step of calculating the matching score for the encoded text string representation of each function of the received source code with respect to each encoded text string representation of the source code fragments comprises calculating a binary score indicating whether there is a match or not.

5. The method according to claim 1, where the step of presenting the output derived from the calculated matching scores comprises displaying a representation of the source code repository indicating the matching score for the encoded text string representation of each function of the received source code with respect to each encoded text string representation of the source code fragments, the representation of the source code repository indicating a level of matching within portions of the source code repository.

* * * * *